(12) United States Patent
Babin

(10) Patent No.: US 12,446,592 B2
(45) Date of Patent: Oct. 21, 2025

(54) CANDY WITH VISUAL EFFECTS AND PRODUCTION METHODS THEREOF

(71) Applicant: Katherine Dejarnette Babin, New Orleans, LA (US)

(72) Inventor: Katherine Dejarnette Babin, New Orleans, LA (US)

(*) Notice: Subject to any disclaimer, the term of this patent is extended or adjusted under 35 U.S.C. 154(b) by 322 days.

(21) Appl. No.: 18/333,988

(22) Filed: Jun. 13, 2023

(65) Prior Publication Data

US 2023/0329277 A1 Oct. 19, 2023

Related U.S. Application Data

(60) Provisional application No. 63/368,289, filed on Jul. 13, 2022, provisional application No. 63/362,926, filed on Apr. 13, 2022.

(51) Int. Cl.
*A23G 3/34* (2006.01)
*A23G 3/54* (2006.01)

(52) U.S. Cl.
CPC ........... *A23G 3/0097* (2013.01); *A23G 3/007* (2013.01); *A23G 3/343* (2013.01); *A23G 3/54* (2013.01)

(58) Field of Classification Search
None
See application file for complete search history.

(56) References Cited

U.S. PATENT DOCUMENTS

| | | | | |
|---|---|---|---|---|
| 1,502,006 | A * | 7/1924 | Alvord | G09B 3/02 426/112 |
| 4,668,523 | A * | 5/1987 | Begleiter | A23G 3/28 426/573 |
| 6,811,279 | B2 | 11/2004 | Coleman et al. | |
| 9,295,269 | B2 | 3/2016 | Clarke et al. | |
| 10,481,310 | B2 | 11/2019 | Sears | |
| 2004/0170725 | A1 * | 9/2004 | Begleiter | A23G 3/54 426/87 |

FOREIGN PATENT DOCUMENTS

DE 10159351 A1 * 9/2002

* cited by examiner

*Primary Examiner* — Jyoti Chawla
(74) *Attorney, Agent, or Firm* — Dunlap Bennett & Ludwig, PLLC; Anna L. Kinney

(57) ABSTRACT

A confection having a specialized sensory effect includes a sugar base a sensory additive and/or a patterned surface that exhibits an anaglyph image; a stereoscopic image; steganography; lenticular printing; a mirrored finish; a cryptogram; a hologram; or any combination of the images. The sensory additive is a physiochromic agent; a glitter; a candy dust; a sensate agent; or any combination of the additives. These confections add an element of surprise and create a lasting impression on a consumer.

6 Claims, 4 Drawing Sheets

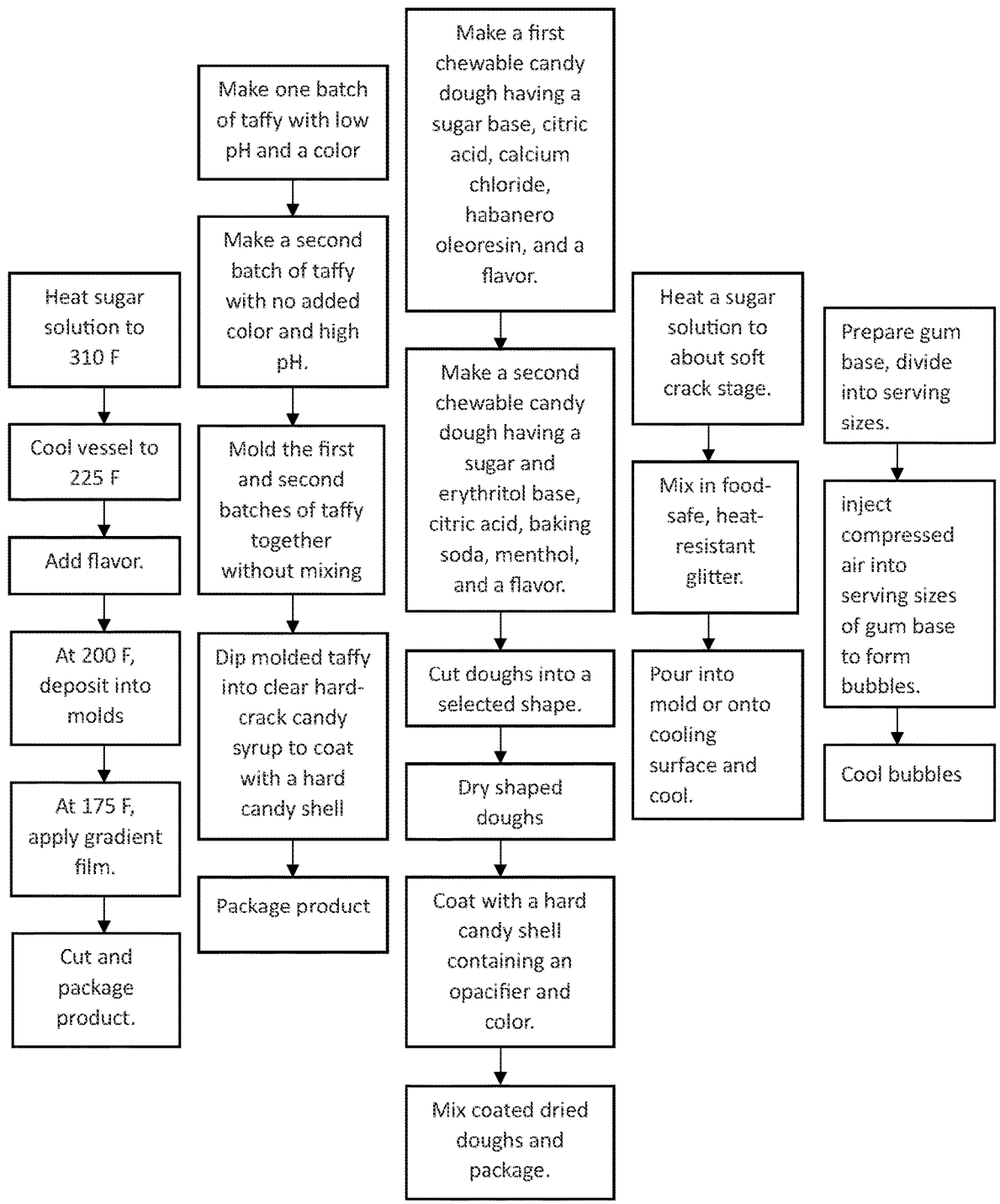

CANDY WITH VISUAL EFFECTS AND PRODUCTION METHODS THEREOF

CROSS-REFERENCE TO RELATED APPLICATION

This application claims the benefit of priorities of U.S. provisional application No. 63/362,926, filed Apr. 13, 2022, and U.S. provisional application No. 63/368,289, filed Jul. 13, 2022, the contents of which are herein incorporated by reference.

BACKGROUND OF THE INVENTION

The present invention relates to candy manufacture and, more particularly, to candy with visual effects and production methods thereof.

Candies currently available to consumers are very limited in the visual effects they produce, leaving a void in the market. Currently candy on the market functions for consumption only.

Food colorants are well-known and regulated by government agencies. In the United States, food colorants are tested by the Food and Drug Administration and synthetic food colorants are typically marked as "FD&C Color No. X" or "D&C Color No. X" to indicate that the colorant is approved for use in foods, drugs, and cosmetics.

Approved food grade colorants include natural colorants and synthetic dyes and lakes approved for human consumption. Dyes are typically water-soluble colorants, while lakes typically are prepared as a dye absorbed on to a water-insoluble substrate to create a non-migrating pigment for applications where water may be present, and no migration of the color is desired. The lake can also be easily incorporated into water-insoluble foodstuffs such as systems containing oils and fats. In some embodiments, a water-soluble dye may be emulsified with an oil (e.g., coconut oil) to allow the dye to be incorporated into water-insoluble foodstuffs. Natural food dyes may include caramel coloring (brown), annatto (orange), copper chlorophyllin (green), carmine/cochineal extract (red), beet juice (red), paprika oleoresin (red orange), saffron (yellow), turmeric (yellow orange), beta carotene (yellow orange), black carrot and many other fruit and vegetable sources of anthocyanins (pink-red-purple), and other colorants derived from fruit or vegetable juices or extracts. FD&C approved synthetic food dyes may include FD&C Blue No. 1, FD&C Blue No. 2, FD&C Green No. 3, FD&C Red No. 40, FD&C Red No. 3, FD&C Yellow No. 5, and FD&C Yellow No. 6. To achieve a desired color tint or shade, a colorant may include mixtures of more than one food grade synthetic dye or lake and/or natural colorant or pigment. However, food colorants do not produce changing or intriguing visual effects.

As can be seen, there is a need for candies having visual effects and methods of manufacturing them.

SUMMARY OF THE INVENTION

In one aspect of the present invention, a confection having a specialized sensory effect, comprises a sugar base; and at least one of: a sensory additive selected from the group consisting of: a physiochromic agent; a glitter; a candy dust; a sensate agent; and any combination thereof; and a patterned surface effective to exhibit a visual effect selected from the group consisting of: an anaglyph image; a stereoscopic image; steganography; lenticular printing; a mirrored finish; a cryptogram; a hologram; and any combination thereof.

The present invention provides candies having specified visual elements made by select methods. These candies add an element of surprise and create a lasting impression on a consumer.

These and other features, aspects and advantages of the present invention will become better understood with reference to the following drawings, description, and claims.

BRIEF DESCRIPTION OF THE DRAWINGS

FIGS. 7A, 7B, 7C, 7D, and 7E are flowcharts of methods of producing candies according to embodiments of the present invention.

DETAILED DESCRIPTION OF THE INVENTION

Figure 1:
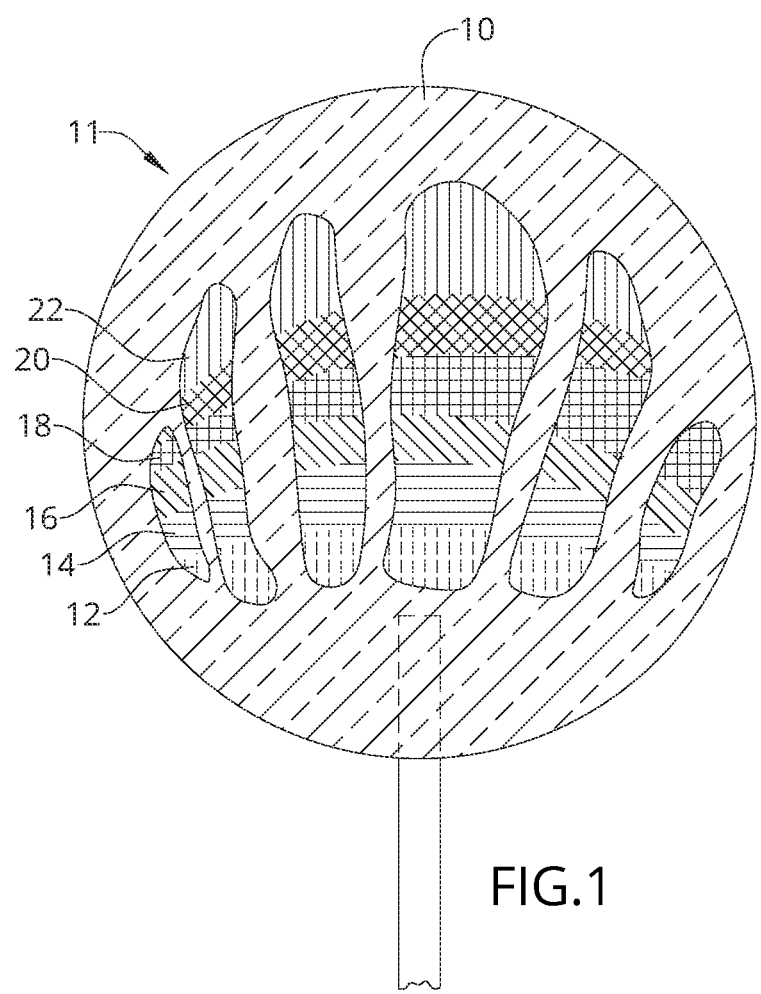
FIG. 1 is a schematic view of a candy with a holographic rainbow image according to an embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

As used herein, the temperature ranges associated with the following well-known heated sugar solution stages are: thread stage: about 215-235° F.; soft-ball stage: above 235° F. to about 240° F.; Firm-ball stage: about 245° F. to about 250° F.; hard-ball stage: above 240° to about 265° F.; soft-crack stage: about 270° F. to about 290° F.; and hard-crack stage: about 300 degrees Fahrenheit and above. In this regard, a sugar solution heated to a temperature of 265 to 270° F. may fall either into hard-ball stage or soft-crack stage, and a sugar solution heated to a temperature of 290° F. to 300° F. may fall either into soft-crack stage or hard-crack stage. Sugar solutions are generally kept to a temperature that does not exceed 330° F. unless browning due to caramelization is desired for the product.

Broadly, one embodiment of the present invention is a candy product having a predetermined visual effect.

These effects may include an anaglyph image for a three-dimensional (3D) image on a surface of the candy; stereoscopic images displayed on a surface of the candy; steganography displayed on a surface of the candy; and lenticular printing on a surface of the candy.

In some embodiments, the candy may change color. Physiochromic agents are color changing agents that change color in response to a physiologic parameter, such as pH or temperature.

In some embodiments the candy may have an edible mirrored finish and may function, for example, as an edible mirascope.

In some embodiments, the visual effects are observable with the naked eye. In other embodiments, the visual effect may be achieved with an accessory, such as decoder glasses to reveal a secret image or message (e.g., a cryptogram). For example, a 3D/anaglyph candy, e.g., using cyan and blue coloring, may be used with glasses to reveal an image.

Some embodiments of the present invention include a method of producing the candy product having a predetermined visual effect.

For example, hologram candy, gum, chewy candy, sprinkles, lollipops, gummies, etc. may be produced in a food-safe, heat-resistant mold having an etched diffraction grating surface to achieve holographic visual effects.

Glitter candy, gum, chewy candy, sprinkles, lollipops, gummies, etc. may be produced by adding a food-safe, heat-resistant glitter, having a melting temperature about 330° Fahrenheit, such as mica flakes or powder, to the candy base during the cooking process, for example, prior to a soft-crack stage.

In some embodiments, the candy may be printed with edible inks to produce visual effects.

In some embodiments, the candy may be manufactured in a layered method utilizing a food safe 3D printer.

The candy of the present disclosure may exhibit combined visual effects. For example, a layered lollipop candy may have a different flavor and/or color per layer, and, in some cases, may have a glitter layer or a glitter taffy center. A rainbow layered pop exhibiting several colors of the rainbow may also be combined with a sprinkle center.

Another embodiment of the present invention is candies with a specified visual effect that may be combined with other sensory effects, e.g., related to senses selected from the group consisting of taste, smell, touch, sound, and combinations thereof. For example, a candy may emit puffs of sugar smoke or glitter dust. Candy clouds may be suitable for such an effect. In another example, a candy may contain a sensate agent such as menthol to produce a cold sensation (temperature changing cold) when eaten or a candy may contain a sensate agent such as capsaicin to produce a hot sensation (temperature changing hot) when consumed.

Some embodiments of the present invention include a method of producing candies having combined sensory effects.

Sensate compounds may include cooling agents, warming agents, tingling agents, effervescent agents, and combinations thereof. A variety of well-known cooling agents may be employed. For example, useful cooling agents may include xylitol, erythritol, dextrose, sorbitol, menthane, menthone, ketals, menthone ketals, menthone glycerol ketals, substituted p-menthanes, acyclic carboxamides, mono menthyl glutarate, substituted cyclohexanamides, substituted cyclohexane carboxamides, substituted ureas and sulfonamides, substituted menthanols, hydroxymethyl and hydroxymethyl derivatives of p-menthane, 2-mercapto-cyclo-decanone, hydroxycarboxylic acids with 2-6 carbon atoms, cyclohexanamides, menthyl acetate, menthyl salicylate, N,2,3-trimethyl-2-isopropyl butanamide (WS-23), N-ethyl-p-menthane-3-carboxamide (WS-3), isopulegol, 3-(1-menthoxy)propane-1,2-diol, 3-(1-menthoxy)-2-methylpropane-1,2-diol, p-menthane-2,3-diol, p-menthane-3,8-diol, 6-isopropyl-9-methyl-1,4-dioxaspiro[4,5]decane-2-methanol, menthyl succinate and its alkaline earth metal salts, trimethyl cyclohexanol, N-ethyl-2-isopropyl-5-methylcyclohexanecarboxamide, Japanese mint oil, peppermint oil, 3-(l-menthoxy)ethan-1-ol, 3-(1-menthoxy)propan-1-ol, 3-(1-menthoxy)butan-1-ol, 1-menthylacetic acid N-ethyl amide, 1-menthyl-4-hydroxypentanoate, 1-menthyl-3-hydroxybutyrate, N,2,3-trimethyl-2-(1-methylethyl)-butanamide, n-ethyl-t-2-c-6 nonadienamide, N,N-dimethyl menthyl succinimide, substituted p-menthanes, substituted p-menthane-carboxamides, 2-isopropanyl-5-methylcyclohexanol (from Hisamitsu Pharmaceuticals, hereinafter "isopregol"); menthone glycerol ketals (FEMA 3807, trade name FRESCOLAT® type MGA); 3-1-menthoxypropane-1,2-diol (from Takasago, FEMA 3784); and menthyl lactate; (from Haarmann & Reimer, FEMA 3748, tradename FRESCOLAT® type ML), WS-30, WS-5, WS-14, Eucalyptus extract (p-Mehta-3,8-Diol), Menthol (its natural or synthetic derivatives), Menthol PG carbonate, Menthol EG carbonate, Menthol glyceryl ether, N-tertbutyl-p-menthane-3-carboxamide, P-menthane-3-carboxylic acid glycerol ester, Methyl-2-isopryl-bicyclo(2.2.1), Heptane-2-carboxamide; and Menthol methyl ether, and menthyl pyrrolidone carboxylate among others. These and other suitable cooling agents are further described in the following U.S. patents, all of which are incorporated in their entirety by reference hereto: U.S. Pat. Nos. 4,230,688; 4,032,661; 4,459,425; 4,136,163; 5,266,592; 6,627,233. For example, citric acid, baking soda, and menthol may be used in a sugar and erythritol base.

In some embodiments, warming components may be selected from a wide variety of compounds known to provide the sensory signal of warming to the user. These compounds offer the perceived sensation of warmth, particularly in the oral cavity, and often enhance the perception of flavors, sweeteners, and other organoleptic components. In some embodiments, useful warming compounds may include vanillyl alcohol n-butyl ether (TK-1000) supplied by Takasago Perfumery Company Limited, Tokyo, Japan, vanillyl alcohol n-propyl ether, vanillyl alcohol isopropyl ether, vanillyl alcohol isobutyl ether, vanillyl alcohol n-amino ether, vanillyl alcohol isoamyl ether, vanillyl alcohol n-hexylether, vanillyl alcohol methyl ether, vanillyl alcohol ethylether, gingerol, shogaol, paradol, zingerone, capsaicin, dihydrocapsaicin, nordihydrocapsaicin, homocapsaicin, homodihydrocapsaicin, ethanol, isopropyl alcohol, iso-amyl alcohol, benzyl alcohol, glycerin, and combinations thereof. For example, a combination of citric acid, calcium chloride, and habanero oleoresin in a sugar base may be used.

Sensate components may also include "trigeminal stimulants" such as those disclosed in U.S. Patent Application No. 2005/0202118, which is incorporated herein by reference. Trigeminal stimulants are defiled as an orally consumed product or agent that stimulates the trigeminal nerve. Examples of cooling agents which are trigeminal stimulants include menthol, WS-3, N-substituted p-menthane carboxamide, acyclic carboxamides including WVS-23, WS-5, WS-14, methyl succinate, and menthone glycerol ketals. Trigeminal stimulants may also include flavors, tingling agents, Jambu extract, vanillyl alkyl ethers, such as vanillyl n-butyl ether, spilanthol, Echinacea extract, Northern Prickly Ash extract, capsaicin, capsicum oleoresin, red pepper oleoresin, black pepper oleoresin, piperine, ginger oleoresin, gingerol, shoagol, cinnamon oleoresin, cassava oleoresin, cinnamic aldehyde, eugenol, cyclic acetal of vanillin and menthol glycerin ether, unsaturated amides, and combinations thereof. Other cooling compounds may include derivatives of 2,3-dimethyl-2-isopropylbutyric acid such as those disclosed in U.S. Pat. No. 7,030,273, which is incorporated herein by reference.

In addition to trigeminal nerve stimulants and cooling compounds, a cooling sensation may be provided by materials exhibiting a negative heat of solution including, but not limited to, dextrose, polyols such as xylitol, erythritol, isomalt, and sorbitol, and combinations thereof.

In some embodiments, the candy is a pre-inflated bubble formed of gum, i.e., a "bubble gum", which may be produced by injecting compressed air into the gum base while it is still warm.

Referring to FIGS. 1-4, 5A, 5B, 6, and 7, FIG. 1 illustrates a holographic candy 10 having a color-shifting rainbow image 11 on its surface, exhibiting several colors 12, 14, 16, 18, 20, and 22. The image may be produced e.g., by utilizing a mold that imparts a holographic surface pattern (texture).

Figure 2:
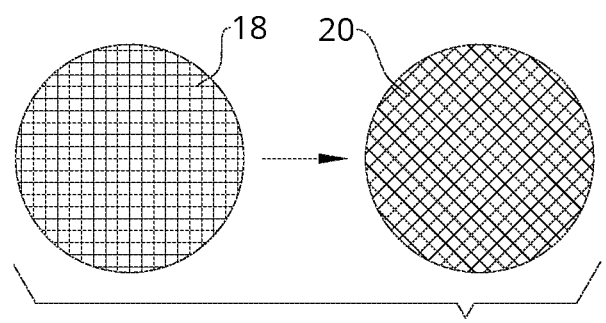
FIG. 2 is a schematic view of a color-changing candy according to an embodiment of the present invention.

FIG. 2 illustrates a candy that changes from a first color 18 to a second color 20 upon exposure to changing conditions, such as temperature, pH, water content, etc.

Figure 3:
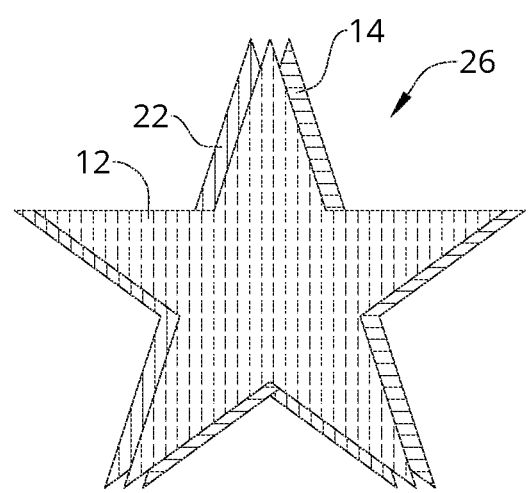
FIG. 3 is a schematic view of a candy having an anaglyph image according to an embodiment of the present invention.

As shown in FIG. 3, a candy shape 26 produced with multiple overlapping colors 14, 22 (e.g., red and blue) may exhibit an anaglyph visual effect, producing a 3D image 12 when viewed with 3D glasses.

Figure 4:
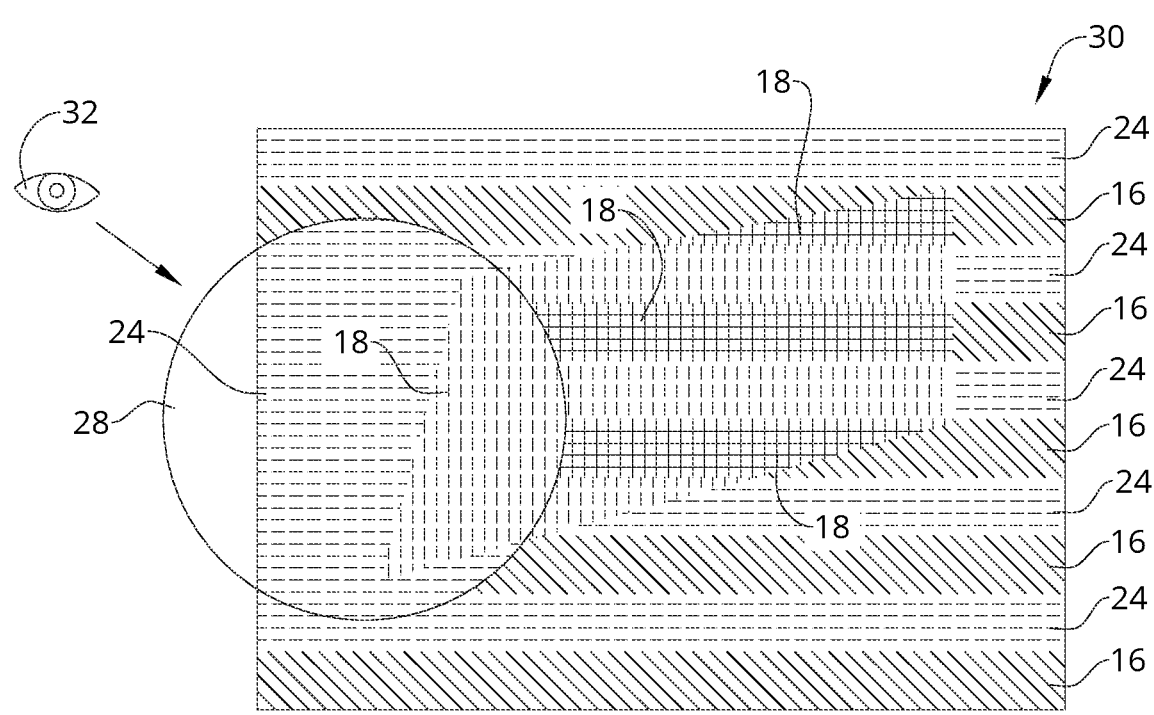
FIG. 4 is a schematic view of a candy having a stereograph image according to an embodiment of the present invention.

FIG. 4 illustrates a composite stereograph 30 having interlaced color images 16, 24 producing a different image 18 determined by the direction from which it is viewed by user's eyes 32 through a lenticular lens 28 or resolving screen. The stereograph 30, the lenticular lens 28, or both may be formed of candy.

Figure 5A:
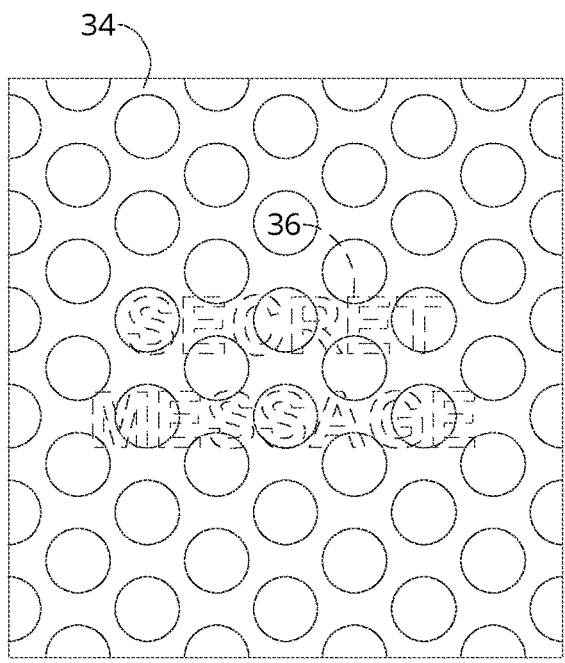
FIG. 5A is a schematic view of an encoded candy sheet according to an embodiment of the present invention.
Figure 5B:
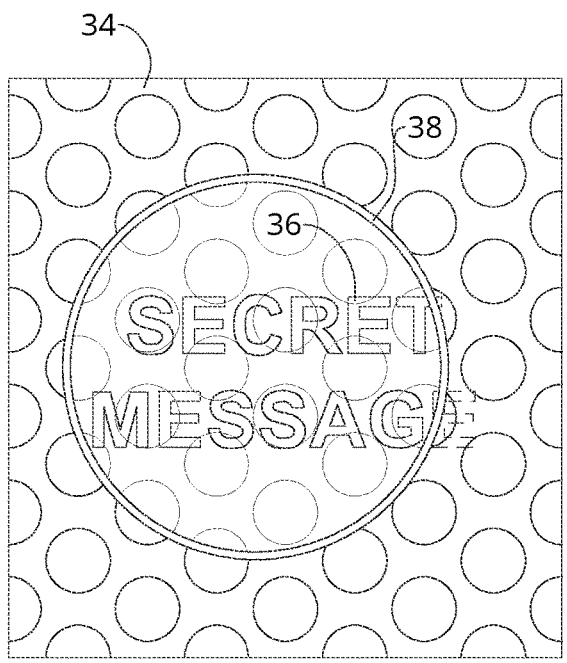
FIG. 5B is a schematic view thereof, shown in use with a visual filter.

FIGS. 5A and 5B show an encoded sheet 34 having a secret message 36 that is only visible when viewed through a visual filter 38. The encoded sheet 34, the visual filter 38, or both may be formed of candy.

Figure 6:
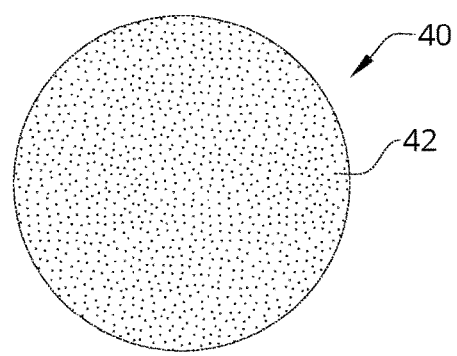
FIG. 6 is a schematic view of a candy having a glitter visual effect according to an embodiment of the present invention.

FIG. 6 illustrates a candy 40 containing food-safe glitter 42.

FIGS. 7A, 7B, and 7C are flowcharts illustrating method steps disclosed in the examples below. FIG. 7D is a flowchart illustrating method steps for preparing the candy of FIG. 6. FIG. 7E is a flowchart showing method steps for preparing bubble gum bubbles.

The present invention will be further illustrated by the examples hereinafter. One of ordinary skill in the art will appreciate that the methods disclosed below are by way of example only and are not intended to limit the invention.

EXAMPLES

Example 1

A method of producing a holographic candy includes the following steps.
1. Sugar solution is brought up to 310° F.
2. Candy vessel is immediately cooled to 225° F. using glycol jacketed chiller or other medium.
3. Flavor is added and mixed well.
4. Candy is deposited into molds at 200° F.
5. Candy has gradient film applied to film at 175° F.
6. Film is cut to mold and suckers are packaged with film attached.
7. Candy is not subjected to temperatures over 110° F. after packaging.
8. Film is removed by the consumer who then sees the rainbow.

Packaging film inhibits rainbow from showing through, so it is ideal for shelf life to keep the film attached.

Example 2

A method of producing a color changing candy includes the following steps.
1. Two taffies are made. Flavor(s) is not particularly limited. One of the taffies has a reagent that changes color upon a pH change.
   one with color is low pH (i.e., less than 7).
   one uncolored has high pH (i.e., more than 7).
2. The two taffies are molded together but not mixed.
3. The molded taffy is dipped into a clear hard candy to create a thin candy shell to protect it from reacting during storage.
4. Suckers are packaged and ready for sale.

Example 3

A method of producing a candy having a temperature changing effect includes the following steps.
1. Chewable center "doughs" are created.
A dough having a warming effect contains a sugar base with citric acid, calcium chloride, habanero oleoresin, and a selected flavor, such as latte flavor.
A dough having a cooling effect contains a sugar and erythritol base with citric acid, baking soda, menthol, and a selected flavor, such as ice cream flavor.
2. The dough is extruded into rope and sliced, or disks are punched out to form a selected shape.
3. The sliced pieces or disks are dried in a dehydrator or drying/hardening room.
4. In some embodiments, the pieces are panned with a hard candy shell containing OPAQ™, an opacifying agent from EFCO Products, Inc., and colored with either different colors or the same coloring.
5. Both varieties are mixed and packaged together.

It should be understood, of course, that the foregoing relates to exemplary embodiments of the invention and that modifications may be made without departing from the spirit and scope of the invention as set forth in the following claims.

What is claimed is:

1. A method for preparing the a confection having a specialized sensory effect, comprising:
   a sugar base; and
   at least one of:
   a sensory additive selected from the group consisting of: a physiochromic agent; a glitter; a candy dust; a sensate agent; and any combination thereof; and
   a patterned surface effective to exhibit a visual effect selected from the group consisting of: an anaglyph image; a stereoscopic image; steganography; lenticular printing; a mirrored finish; a cryptogram; a hologram; and any combination thereof,
   comprising:
   preparing a sugar solution;
   heating the sugar solution to a temperature from about 300° F. to about 310° F. to achieve a hard-crack stage to form the sugar base;
   cooling the sugar base to between about 200° F. and less than 300° F.;
   blending flavoring, coloring, and/or the sensory additive into the sugar base to form a blend;

depositing the blend into at least one mold, wherein the mold has an etched diffraction grating surface to achieve a holographic visual effect; and cooling the blend until its surface temperature is between about 110-200° F.

2. The method of claim 1, wherein the visual effect is visible with an accessory.

3. The method of claim 1, wherein the glitter is food-safe and heat-resistant, with a melting temperature above 300° F.

4. The method of claim 1, wherein the patterned surface is formed of edible inks.

5. The method of claim 1, wherein the patterned surface has a three-dimensional configuration that reflects and/or diffracts light.

6. The method of claim 1, having more than one layer, wherein the sensory additive varies with each layer.

* * * * *